| (12) | United States Patent | (10) Patent No.: | US 10,948,731 B2 |
|---|---|---|---|
| | Downing | (45) Date of Patent: | Mar. 16, 2021 |

(54) DIFFRACTIVE OPTICAL ELEMENT AND METHOD FOR THE DESIGN OF A DIFFRACTIVE OPTICAL ELEMENT

(71) Applicant: STMicroelectronics (Research & Development) Limited, Marlow (GB)

(72) Inventor: James Peter Drummond Downing, Doune (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 233 days.

(21) Appl. No.: 16/037,590

(22) Filed: Jul. 17, 2018

(65) Prior Publication Data

US 2018/0341117 A1 Nov. 29, 2018

Related U.S. Application Data

(62) Division of application No. 14/862,328, filed on Sep. 23, 2015, now abandoned.

(51) Int. Cl.
*G02B 27/09* (2006.01)
*G02B 27/30* (2006.01)
*G02B 27/00* (2006.01)

(52) U.S. Cl.
CPC ..... *G02B 27/0944* (2013.01); *G02B 27/0012* (2013.01); *G02B 27/0927* (2013.01); *G02B 27/30* (2013.01)

(58) Field of Classification Search
CPC ............ G02B 27/0944; G02B 27/0927; G02B 27/0012; G02B 27/30; G02B 27/4233; G02B 27/4205; G02B 5/1823
See application file for complete search history.

(56) References Cited

U.S. PATENT DOCUMENTS

| 6,002,520 | A | 12/1999 | Dickson et al. |
|---|---|---|---|
| 6,562,253 | B1 | 5/2003 | Ogusu |
| 6,839,174 | B1 | 1/2005 | Ohde et al. |
| 7,969,654 | B1 | 6/2011 | Ersoy et al. |
| 2002/0114076 | A1 | 8/2002 | Dickson et al. |
| 2002/0158131 | A1 | 10/2002 | Dickson et al. |
| 2006/0055883 | A1 | 3/2006 | Morris et al. |

(Continued)

FOREIGN PATENT DOCUMENTS

| CN | 103124914 A | 5/2013 |
|---|---|---|
| CN | 103309137 A | 9/2013 |

OTHER PUBLICATIONS

Third Office Action for co-pending CN Appl. No. 201610099470.7 dated Aug. 1, 2019 (9 pages).

(Continued)

*Primary Examiner* — Kimberly N. Kakalec
(74) *Attorney, Agent, or Firm* — Crowe & Dunlevy

(57) ABSTRACT

A diffractive optical element (DOE) is designed to implement both a collimation function with respect to an input divergent beam and a beam shaping function with respect to an output divergent beam. The phase designs of the collimation function and the beam shaping function are independently produced in the phase domain. These phase designs are then combined using a phase angle addition of the individual functions and wrapped between 0 and 2π radians. The diffractive surface of the DOE is then defined from the wrapped phase angle addition of the individual functions.

18 Claims, 6 Drawing Sheets

(56) References Cited

U.S. PATENT DOCUMENTS

| | | | |
|---|---|---|---|
| 2007/0153402 A1 | 7/2007 | Destain | |
| 2008/0043339 A1* | 2/2008 | Rubinstein | G02B 27/09 359/642 |
| 2012/0038918 A1 | 2/2012 | Liu et al. | |
| 2013/0038881 A1 | 2/2013 | Pesach et al. | |
| 2013/0107691 A1* | 5/2013 | Nishiwaki | G02B 5/1823 369/108 |
| 2014/0346334 A1 | 11/2014 | Grossinger et al. | |
| 2015/0178905 A1* | 6/2015 | Fletcher | G06K 9/4604 382/132 |

OTHER PUBLICATIONS

First Office Action and Search Report for co-pending CN Appl. No. 201610099470.7 dated Jul. 2, 2018 (6 pages).

* cited by examiner

DIFFRACTIVE OPTICAL ELEMENT AND METHOD FOR THE DESIGN OF A DIFFRACTIVE OPTICAL ELEMENT

CROSS-REFERENCE TO RELATED APPLICATION

This application is a divisional of U.S. patent application Ser. No. 14/862,328 filed Sep. 23, 2015, the disclosure of which is incorporated by reference.

TECHNICAL FIELD

The present invention relates to beam shaping devices and, in particular, to a diffractive optical element (DOE) and a method for designing a DOE to reduce or eliminate the risk of high intensity zeroth order leakage.

BACKGROUND

Reference is made to FIG. 1 showing a conventional geometry for an optical system 10. The system 10 includes a light source 12 generating a collimated beam 14 of light with a planar wavefront that is propagated toward a beam shaping diffractive optical element 16. The diffractive optical element (DOE) 16 is a shaping (for example, circularly homogenizing) optical element designed to generate a desired non-collimated output beam 18 forming an output field 20 with a desired output intensity distribution. Due to small errors in the diffractive surface of the diffractive optical element 16 (e.g., surface defects introduced during manufacture), there is possibility for a high intensity zeroth order leakage 22 of the collimated beam 14 of light through the diffractive optical element 16 into the output field 20. In this context, reference to "high intensity" means dangerous in that the leakage has a beam divergence and power that is dangerous (see, for example, British standard BS EN 60825-1:2014 or international standard IEC 60825-1:2014, both incorporated by reference).

Reference is made to FIG. 2 showing a conventional geometry for an optical system 10'. The system 10' includes a light source 12' generating a divergent beam 26 of light that propagates toward a collimating lens 28. The collimating lens 28 functions to collimate the divergent beam 26 and output a collimated beam 14 of light with a planar wavefront that propagates toward a beam shaping diffractive optical element 16. The diffractive optical element 16 is a shaping (for example, circularly homogenizing) optical element designed to generate a desired non-collimated output beam 18 forming an output field 20 with a desired output intensity distribution. Due to small errors in the diffractive surface of the diffractive optical element 16 (e.g., surface defects introduced during manufacture), there is possibility for a high intensity zeroth order leakage 22 of collimated beam 14 of light through the diffractive optical element 16 into the output field 20.

The high intensity zeroth order leakage 22 in FIGS. 1 and 2 is ostensibly an unmodified portion of the collimated beam 14 present in the output field 20. The effect of this is illustrated, for example, in FIG. 3 which shows an image (with inverted contrast) of a square homogenized output field 20 that is corrupted by high intensity zeroth order leakage 22. If the light source 12 or 12' is, for example, a laser light source, this zeroth order leakage 22 is a safety risk that will have a direct effect on the permitted operating power of the light source 12 or 12'. In response the existence of or chance for such leakage, the power level of the light source 12 or 12' must be reduced to ensure safe operation, and no benefit is gained from using the diffractive optics.

Evaluation of the beam shaping diffractive optical element 16: There are many sources of error that can degrade the form factor of the diffractive optic with respect to the initial design form. If magnitudes of these errors are set to limits expected in manufacture, the error in the height of the module (i.e., the depth error) is recognized as the key contributor to degradation of optic performance. FIGS. 3A-3C illustrate simulated results of the element 16 with a nominal depth error (i.e., less than or equal to 5%) in FIG. 3A, a 10% depth error in FIG. 3B and a 15% depth error in FIG. 3C. It will be noted that with more significant depth errors homogenization is affected and the zeroth order leakage characteristic (reference 22) becomes more dominant.

Diffractive optics allow the optical system designer to manipulate a wavefront in ways that cannot be achieved with refractive optics. This allows a greater flexibility of the functionality of the optic and enables applications that are not supported by refractive optics. There is a need, however, for an improved diffractive optical element that is not susceptible to surface errors which would permit passage of high intensity zeroth order leakage. As a result, operation of the optical system at higher power levels would be possible.

SUMMARY

In an embodiment, an optical system comprises: a collimating and beam shaping diffractive optical element configured to modify an input divergent beam and produce an output divergent beam; wherein the collimating and beam shaping diffractive optical element comprises a diffractive surface having a design which both collimates the input divergent beam and shapes the collimated input divergent beam into the output divergent beam to form an output field with a desired output intensity distribution.

In an embodiment, a method comprises: defining a first phase profile for collimation of an input divergent beam; defining a second phase profile for shaping an output divergent beam; adding the first and second phase profiles to form a combined phase profile; and forming a diffractive surface of a diffractive optical element from the combined phase profile so that the diffractive surface of the diffractive optical element is configured to both collimate the input divergent beam and shape collimated input divergent beam into the output divergent beam to form an output field with a desired output intensity distribution.

In an embodiment, a method comprises: independent design of a first phase profile for a collimation function and a second phase profile for a beam shaping function; combination of the independently designed first and second phase profiles using a phase angle addition; wrapping of the phase angle addition between 0 and $2\pi$ radians; and production of a physical optic using a diffractive surface defined by the wrapped phase angle addition.

BRIEF DESCRIPTION OF THE DRAWINGS

Other advantages and characteristics of the invention will become apparent on studying the detailed description of embodiments, which are taken by way of non-limiting examples and are illustrated by the appended drawings, in which.

DETAILED DESCRIPTION

Figure 4:
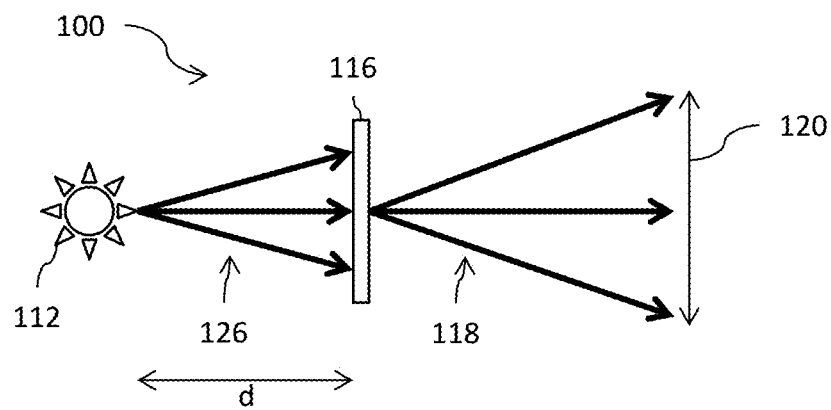
FIG. 4 shows a geometry for an embodiment of an optical system.

Reference is now made to FIG. 4 showing a geometry for an optical system 100. The system 100 includes a light source 112 generating a divergent beam 126 of light that propagates toward a collimating and beam shaping diffractive optical element 116. The diffractive optical element (DOE) 116 performs two functions: a) the DOE collimates the input divergent beam 126 of light; and b) the DOE shapes the light to generate a desired divergent (non-collimated) output beam 118 forming an output field 120 with a desired output intensity distribution (for example, homogenized with a certain shape).

The advantage of the DOE 116 is that any surface error that would inhibit the correct operation of the beam shaping optic will also inhibit the correct operation of the collimating function. As a result, the DOE 116 impedes output of a high intensity zeroth order leakage (for example, collimated) beam in the presence of surface errors and permits higher power operation of the light source 112 in comparison to the systems of FIGS. 1 and 2 if exposed to an equivalent surface error or defect.

Figure 1:
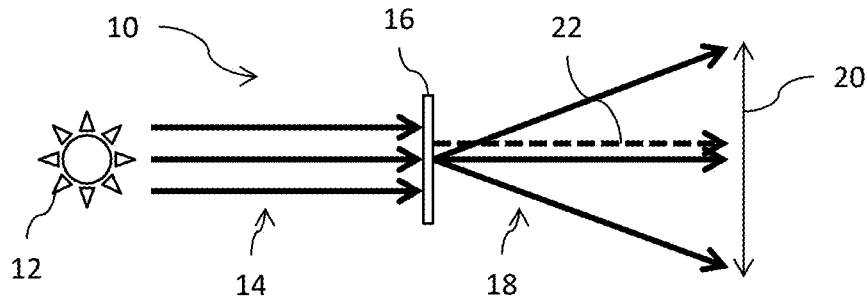
FIGS. 1 and 2 show conventional geometries for optical systems.
Figure 2:
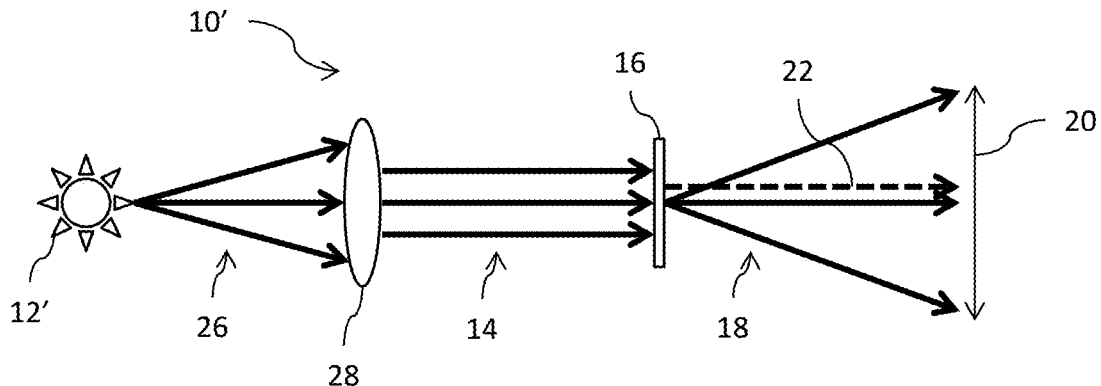

The design of the DOE 116 utilizes a process that includes: a) independent design of a phase-only diffractive lens profile and a phase-only beam shaper optic; b) combination of the two independent designs using a phase angle addition of their individual functions; and c) production of the physical optic, for example the diffractive surface, that will perform the function of the phase-combined designs. The combined diffractive lens and beam shaping designs are preferably implemented in a single diffractive optic surface of the DOE 116. The independent or decoupled optimization of the collimation function and the beam shaping function during phase-only design simplifies the optimization process and improves the efficiency and uniformity of the output field 120. The collimating and beam shaping functions are first independently defined in the phase space, with those functions then summed in the phase space (for example, using phase angle addition) and converted to the physical to yield a single surface profile for the optic that will perform both the collimating and beam shaping functions. The advantage of this implementation derives from the combined effect a manufacturing error will have on the performance of the collimating and beam shaping functions. Any surface profile error in the optic that deviates from the nominal design will impede the ability of the DOE 116 optic to perform both functions. Therefore, with an error, the ability of the optic to form an undesirable high intensity collimated beam (such as with high intensity zeroth order leakage) is degraded in the same way as the ability of the optic to form the desired beam shape. As a result, there is a significant reduction in the sensitivity of the optic to manufacturing error (especially in comparison to the conventional approaches as shown in FIGS. 1 and 2 where the beam is discretely collimated and the inclusion of a surface defect may permit passage of a component of the collimated beam as high intensity zeroth order leakage).

In a preferred implementation, the design of the diffractive lens profile must have a focal length equal to a desired separation distance d between the DOE 116 and the light source 114. Furthermore, the design of the beam shaper function must assume that the input light is collimated.

Figure 5:
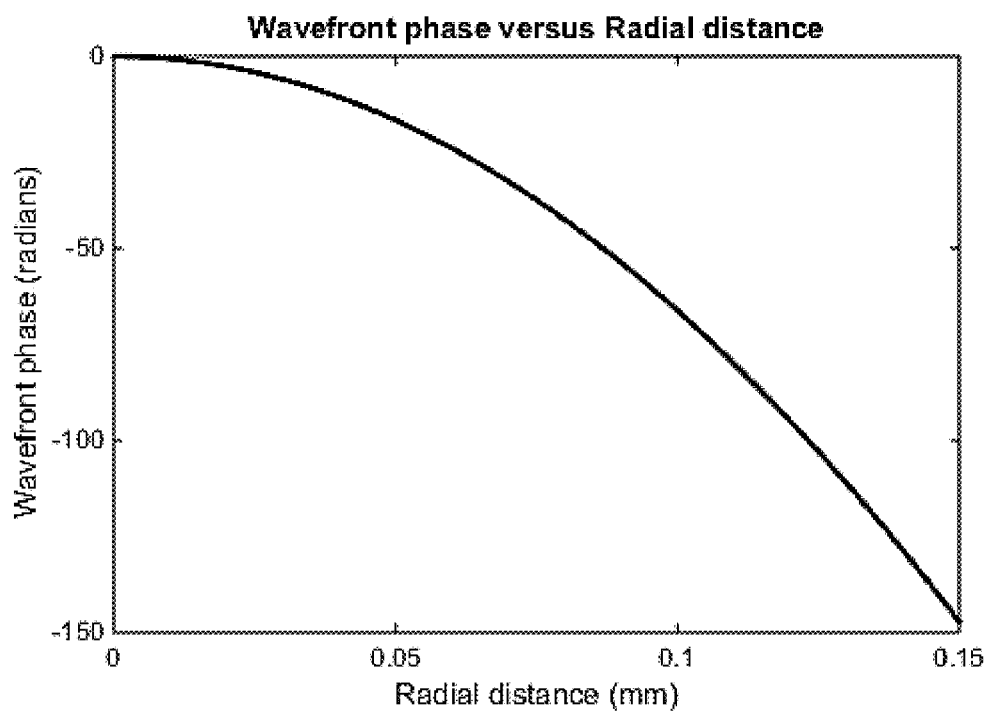
FIG. 5 illustrates the relationship between wavefront phase and radial distance for a point source illumination at a finite distance.

Diffractive lens profile design: The design of a diffractive lens is well known to those skilled in the art. Reference is made to the textbook "Computer design of diffractive optics," Soifer, Elsevier, 2012 (incorporated by reference). For the DOE 116, a lens is designed based on a necessity to correct the curvature of a wavefront from a point source (light source 114) at a finite distance d from the optic. The optic is defined such that its focal length is equivalent to the separation distance d of the point source from the optic. See, for example, FIG. 5.

The lens profile $O(x,y)=\exp[i*\phi(x,y)]$ is designed to add an equivalent opposite phase delay to the wavefront profile $W(x,y)=\exp[i*\varphi(x,y)]$ so that it matches the target phase profile $P(x,y)=\exp[i*\xi(x,y)]$:

$$P(x,y)=W(x,y)+O(x,y)$$

For a collimating lens, the target phase profile $P(x,y)=1$ for all x and y:

$$O(x,y)=P(x,y)-W(x,y)=1-W(x,y)$$

Which is equivalent to:

$$\phi(x,y)=\xi(x,y)-\varphi(x,y)=-\varphi(x,y)$$

Therefore, the collimating lens design must simply apply a phase delay equal in magnitude though in the opposite direction to the input wavefront. This is achieved by first computing $\phi(x,y)$ (see, FIG. 5), then wrapping $\phi(x,y)$ from 0 to $2\pi$ radians:

$$\phi'(x,y)=\arg[O(x,y)]=\arg[\exp(i*\phi(x,y))]$$

Where the arg[ ] operator returns the phase-angle of a complex number O(x,y). It may then necessary to quantize the phase profile $\phi'(x,y)$. This depends on the manufacturing method. Diffractive optics can be formed using many techniques, and in this case a lithographic etching process is assumed which requires the surface to be quantized into discrete phase levels. This phase quantization is not to be considered a limitation or requirement as manufacturing methods exist that permit a continuous phase profile; however for completeness of the example, a quantization step is provided here. Four quantized phase levels are defined between 0 and $$\frac{6}{4}\pi,$$

more generally, the range of quantized levels is between $$0 \to \frac{2\pi(N-1)}{N}.$$

The quantization of the phase profile ϕ'(x,y) into N levels is defined as:

$$\phi_N(x,y) = \mathbb{Q}[\phi'(x,y);N]$$

where the operator $\mathbb{Q}$ defines the quantization operation on a phase profile. In this example, N=4 such that:

$$\phi_4(x,y) = \mathbb{Q}[\phi'(x,y);4]$$

Note that any integer value for N may be selected, with N=4 used herein so that the illustration is made more clear. In general, as N increases, the efficiency of the optic (i.e., the performance) increases, so it is beneficial to design optics with more levels as long as the number of levels remains manufacturable with respect to the diffractive surface.

Figure 6:
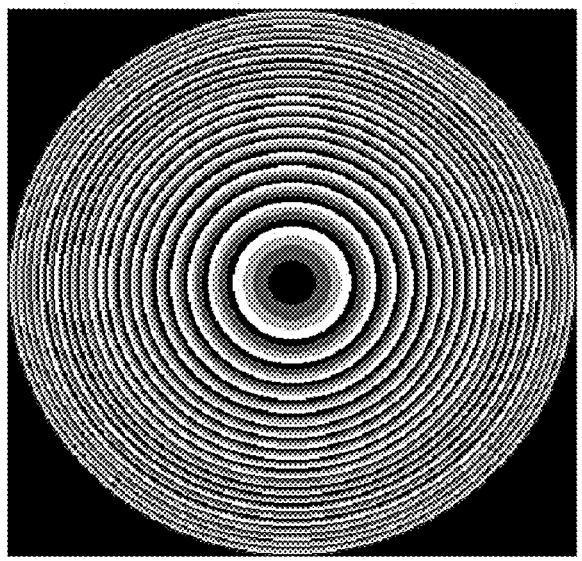
FIG. 6 illustrates a quantized example of a diffractive lens profile design.

Once the quantized phase profile of the lens is computed, it is rotated about its origin to form a radially symmetric lens surface. An example of such a surface is shown in FIG. 6.

Beam shaping optic design: The beam shaping function may be designed to have an arbitrary effect on the output intensity distribution of the incident light source. For example, it may be useful to generate a high resolution grid of points in the output field.

The method for optimization is based on an infinite point source (i.e., collimated) illumination, for which there are many known and published solutions in the literature including the Gerchberg-Saxton algorithm (Gerchberg R. W and Saxton W. O., "A Practical algorithm for the determination of phase from image diffraction plane pictures," Optik (Stuttgart), 35, 237-246, 1972, incorporated by reference), the first of a family of algorithms referred to the art as an Iterative Fourier-Transform Algorithm (IFTA), as well as alternative, global-search algorithms for optimization. Whichever algorithm is used, the outcome is a phase profile χ(x,y) which describes the necessary shape of the wavefront (in phase angle) to produce the desired output intensity distribution in the far-field.

In an example using the Gerchberg-Saxton algorithm, a beam shaping optic phase profile χ(x,y) is generated. The optic function, like the diffractive lens design described above, is in the phase domain. By this it is understood that it has no physical depth, but rather describes the required shape of the wavefront at its output. The optic function in this example is to generate a square top-hat profile. However, it can be any arbitrary output distribution.

Figure 7A:
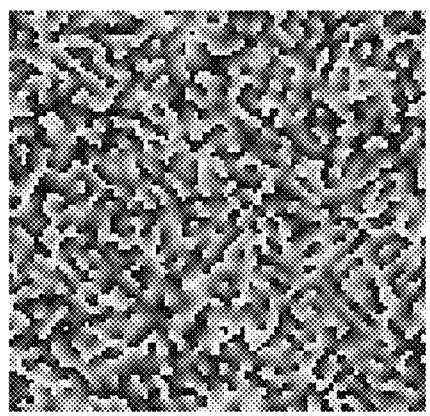
FIGS. 7A-7B illustrate examples for beam shaping optic design at different quantizations.
Figure 7B:
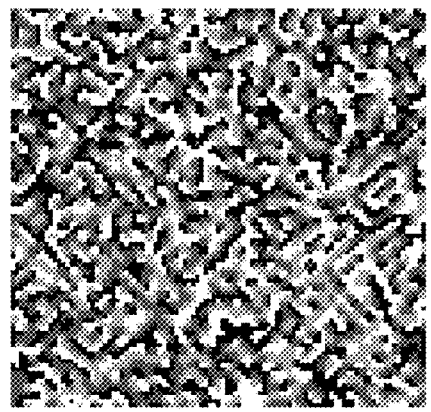

The optic function must be quantized from an infinite number of levels (see, FIG. 7A) to a finite number of levels so that it is compatible with the chosen manufacturing process. As in the example above for the diffractive lens, the phase profile is quantized to N=4 levels using the same quantization operator as described above. FIG. 7B shows the quantized phase profile χ₄(x,y). It will be noted that it is also possible to integrate the quantization process within the IFTA in a so-called 'soft-quantization' process (see, for example, Wyrowski F., "Diffractive optical elements: iterative calculation of quantized, blazed phase structures," JOSA A, Optical Society of America, 7, 961-969, 1990, incorporated by reference). So, in general, it should be clear that there are alternative ways to include quantization into the beam-shaping optic optimization.

Figure 7C:
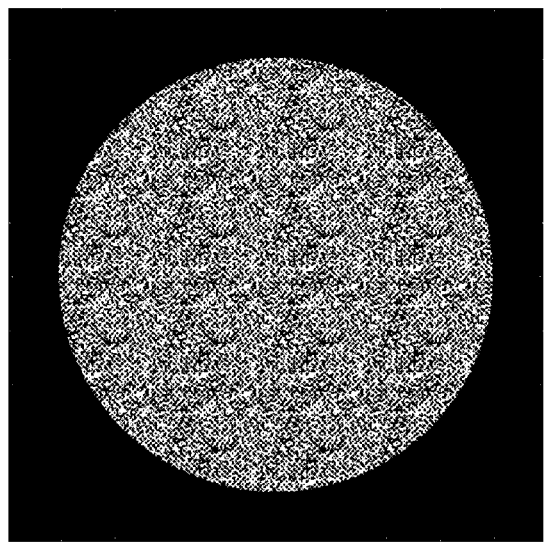
FIG. 7C shows the quantized beam shaping optic of FIG. 7B tessellated to fill and area equivalent to the area of the lens profile of FIG. 6.

In an embodiment, the quantized phase profile of FIG. 7B may be repeated in a tile-like fashion to define an overall quantized phase profile as shown in FIG. 7C.

Combining optics: As noted above, the diffractive lens design and the beam shaper design are both in the phase domain.

The diffractive lens design and beam shaper design are combined by summing together the respective quantized phase profiles:

$$\rho(x,y) = \phi(x,y) + \chi(x,y),$$

In particular, with N=4, the following describes the operation:

$$\rho_4(x,y) = \phi_4(x,y) + \chi_4(x,y),$$

This is a convenient representation as various methods for physical realization of the phase delay in a single diffractive surface are possible to form the diffractive optical element 116. Examples of such physical realizations include a surface relief pattern or a gradient-index (GRIN) material. A specific but not limiting example using a surface relief pattern is provided herein.

Figure 8:
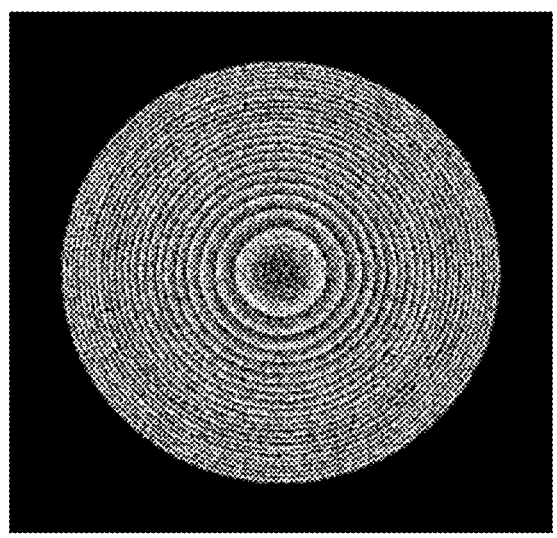
FIG. 8 illustrates the result of summing the phase profiles of a diffractive lens from FIG. 6 and a beam shaping optic such as that shown in FIG. 7C.

FIG. 8 illustrates the result of summing the phase profiles with respect to FIGS. 6 and 7C.

The resulting phase profile ρ(x,y) is then wrapped into 2π radians:

$$\rho'(x,y) = \arg[\exp(i^*\rho(x,y))]$$

For this example, the following is true:

$$\rho_4'(x,y) = \arg[\exp(i^*\rho_4(x,y))]$$

Figure 9:
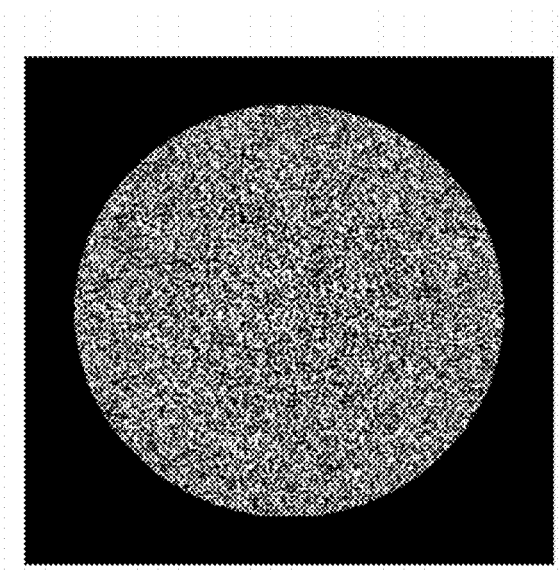
FIG. 9 illustrates the result of wrapping the summed phase profiles between 0 and $2\pi$ radians.

FIG. 9 illustrates the result of wrapping the summed phase profiles as in FIG. 8. One advantage of wrapping in this manner is a compressing the vertical height of features of the physical diffractive surface.

Using knowledge of the refractive index ($n_2$) of the material that the optic will be constructed from, the refractive index of the immersive medium (typically air: $n_1$=1) and the wavelength of the light (λ) for which the optic will be optimized, the wrapped phase profile ρ'(x,y) can then be converted into a physical surface relief profile, S(x,y), using the following relationship:

$$S(x, y) = \frac{\rho'(x, y) \cdot \lambda}{2\pi(n_1 - n_2)},$$

for quantized phase profiles:

$$S_N(x, y) = \frac{\rho_N'(x, y) \cdot \lambda}{2\pi(n_1 - n_2)}.$$

So, it follows in this example with N=4 that:

$$S_4(x, y) = \frac{\rho_4'(x, y) \cdot \lambda}{2\pi(n_1 - n_2)}.$$

Evaluation of the collimating and beam shaping diffractive optical element 116: There are many sources of error that can degrade the form factor of the diffractive optic with respect to the initial design form. If magnitudes of these errors are set to limits expected in manufacture, the error in the height of the module (i.e., the depth error) is recognized as the key contributor to degradation of optic performance.

Figure 3:
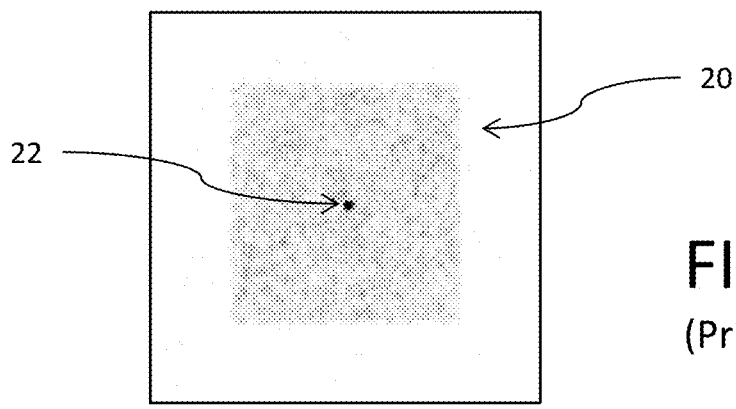
FIG. 3 is an image illustrating the presence of high intensity zeroth order leakage in the output field generated by the systems of FIGS. 1 and 2 due to the presence of an error on the surface of the diffractive optical element.
Figure 3A:
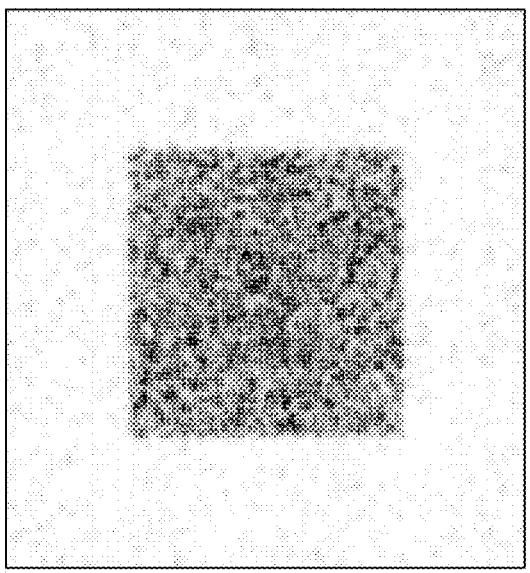
FIGS. 3A-3C illustrate simulated results of a conventional diffractive lens profile design with a variety of depth errors.
Figure 3B:
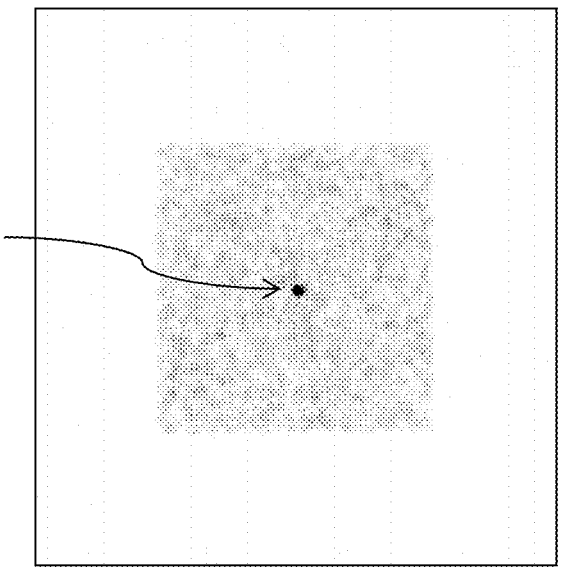
Figure 3C:
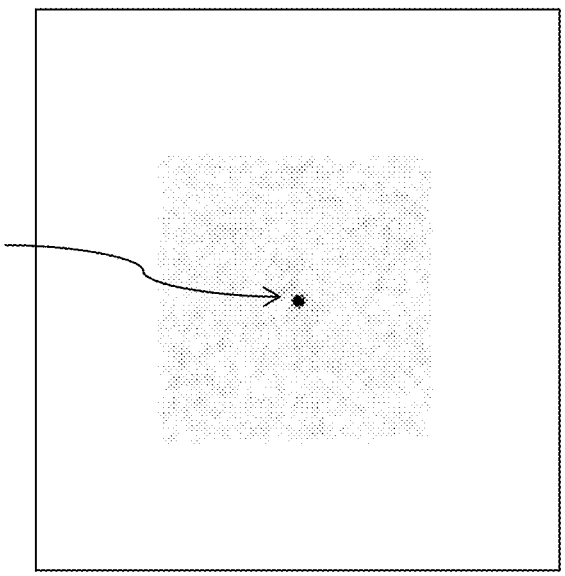
Figure 10A:
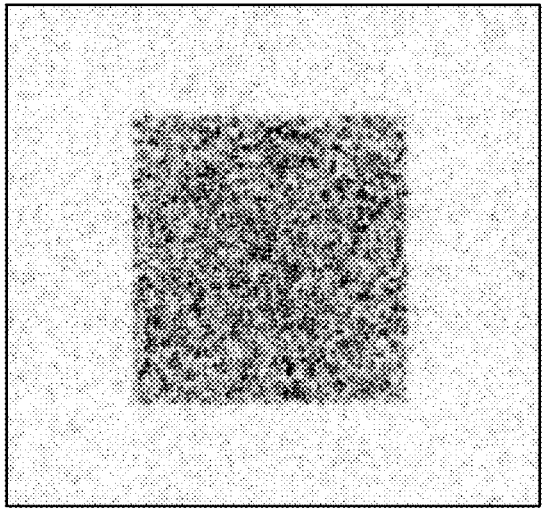
FIGS. 10A-10C illustrate simulated results of the diffractive lens profile design with a variety of depth errors.
Figure 10B:
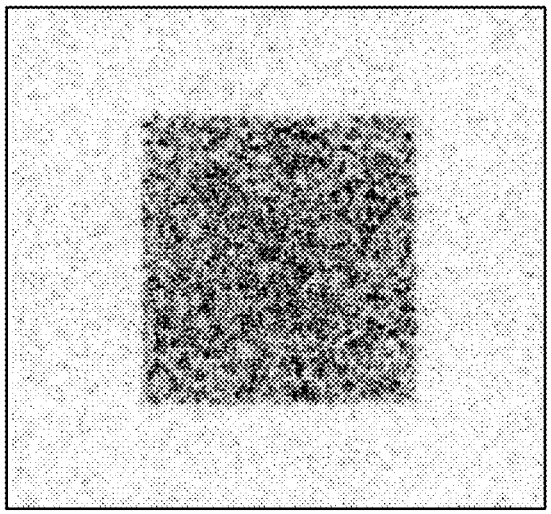
Figure 10C:
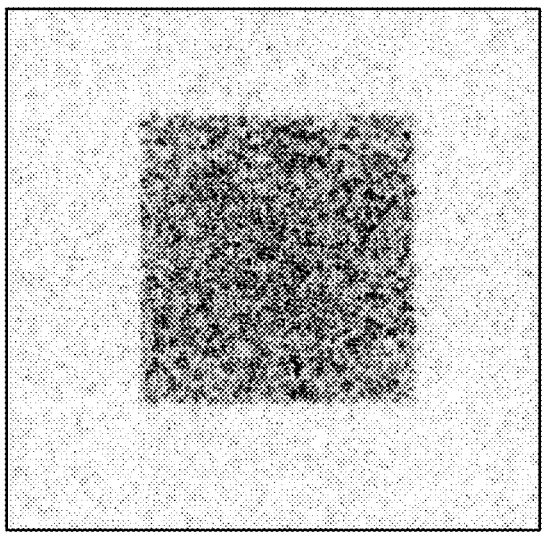

FIGS. 10A-10C illustrate simulated results of the DOE 116 with a nominal depth error (i.e., less than or equal to 5%) in FIG. 10A, a 10% depth error in FIG. 10B and a 15% depth error in FIG. 10C. It will be noted that even with a significant depth error, the DOE 116 fails to exhibit concern with respect to zeroth order leakage (compare to FIG. 3). Furthermore, even at a 50% depth error, the result remains significantly homogenized, while experimentation shows that the zeroth order leakage characteristic of the prior art would instead begin to dominate when a 10% depth error is manifest (see, FIGS. 3B-3C).

The foregoing description has been provided by way of exemplary and non-limiting examples of a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for making a diffractive optical element which both collimates an input divergent beam and beam shapes an output divergent beam, comprising:
    designing in phase space a diffractive lens phase profile for collimating the input divergent beam;
    designing in phase space a beam shaping phase profile for producing the output divergent beam having certain output intensity distribution from a collimated input;
    summing the diffractive lens phase profile and the beam shaping phase profile in phase space to produce a combined phase profile; and
    wrapping the combined phase profile into $2\pi$ radians to define a wrapped phase profile defining a single physical diffractive surface relief profile of said diffractive optical element which both collimates and beam shapes; and
    producing a physical optic having said single physical diffractive surface.

2. The method of claim 1, wherein the diffractive lens phase profile is quantized and wherein the beam shaping phase profile is also quantized.

3. The method of claim 1, wherein wrapping is defined by the relationship $$\rho'(x,y)=\arg[\exp(i*\rho(x,y))]$$

where: $\rho'(x,y)$ is the wrapped phase profile and $\rho(x,y)$ is the combined phase profile.

4. The method of claim 1, wherein the single physical diffractive surface profile $S(x,y)$ is defined by the following relationship:

$$S(x, y) = \frac{\rho'(x, y) \cdot \lambda}{2\pi(n_1 - n_2)},$$

where: $\rho'(x,y)$ is the wrapped phase profile, $\lambda$ is a wavelength of light of the input divergent beam, $n_1$ is a refractive index of an immersive medium and $n_2$ is a refractive index of a material with which the diffractive optical element is made.

5. The method of claim 1, wherein the single physical diffractive surface profile is a quantized surface.

6. The method of claim 1, wherein the single physical diffractive surface profile is a gradient-index (GRIN) material surface.

7. A method, comprising:
    independently designing a first phase profile for a collimation function and a second phase profile for a beam shaping function;
    combining the independently designed first and second phase profiles using a phase angle addition to produce a summed phase profile;
    wrapping of the summed phase profile between 0 and $2\pi$ radians; and
    producing a physical optic using a single diffractive surface defined by the wrapped summed phase profile.

8. The method of claim 7, wherein producing comprises forming a surface relief pattern that implements both the collimation function and the beam shaping function.

9. The method of claim 7, wherein producing comprises forming a gradient-index (GRIN) material that implements both the collimation function and the beam shaping function.

10. The method of claim 7,
    wherein independent designing comprises designing the collimating function in phase space and designing the beam shaping function in phase space;
    wherein combining comprises summing in phase space the collimating function and the beam shaping function; and
    wherein producing comprises forming the single diffractive surface from the summation in phase space.

11. The method of claim 10, wherein the single diffractive surface comprises a quantized surface relief pattern.

12. The method of claim 10, wherein the single diffractive surface comprises a gradient-index (GRIN) material.

13. A method for making a diffractive optical element which both collimates an input divergent beam and beam shapes an output divergent beam, comprising:
    designing in phase space a diffractive lens phase profile for collimating the input divergent beam;
    designing in phase space a beam shaping phase profile for producing the output divergent beam having certain output intensity distribution from a collimated input;
    summing the diffractive lens phase profile and the beam shaping phase profile in phase space to produce a combined phase profile;
    wrapping the combined phase profile into $2\pi$ radians to define a wrapped phase profile; and
    converting the wrapped phase profile into a single physical diffractive surface relief profile of said diffractive optical element which both collimates and beam shapes.

14. The method of claim 13, wherein the diffractive lens phase profile is quantized and wherein the beam shaping phase profile is also quantized.

15. The method of claim 13, wherein wrapping is defined by the relationship $$\rho'(x,y)=\arg[\exp(i*\rho(x,y))]$$

where: $\rho'(x,y)$ is the wrapped phase profile and $\rho(x,y)$ is the combined phase profile.

16. The method of claim 13, wherein the single physical diffractive surface profile $S(x,y)$ is defined by the following relationship:

$$S(x, y) = \frac{\rho'(x, y) \cdot \lambda}{2\pi(n_1 - n_2)},$$

where: ρ'(x,y) is the wrapped phase profile, λ is a wavelength of light of the input divergent beam, $n_1$ is a refractive index of an immersive medium and $n_2$ is a refractive index of a material with which the diffractive optical element is made.

17. The method of claim 13, wherein the single physical diffractive surface profile is a quantized surface.

18. The method of claim 13, wherein the single physical diffractive surface profile is a gradient-index (GRIN) material surface.

* * * * *